June 5, 1928.
E. J. HALL
MOTOR VEHICLE ATTACHMENT
Filed July 26, 1927
1,672,120
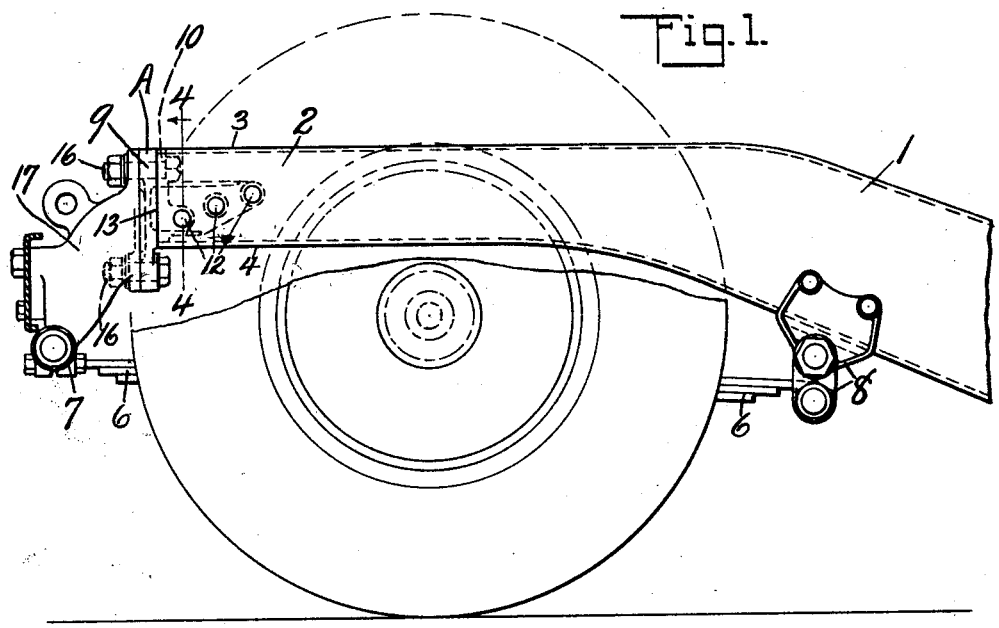
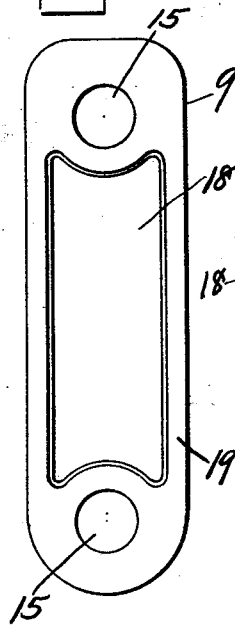
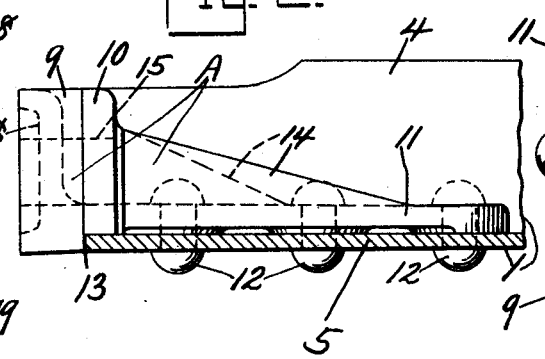
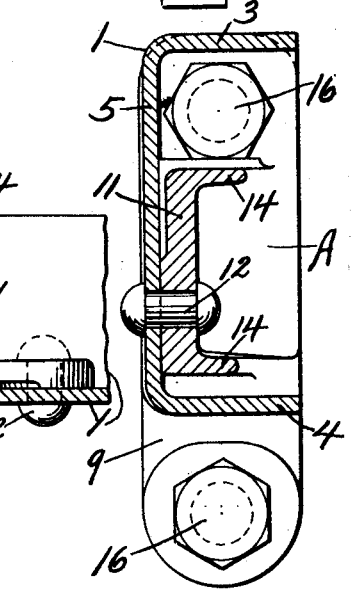
INVENTOR
Elbert J. Hall
BY *J. H. Gibbs*
ATTORNEY Patented June 5, 1928.

1,672,120

UNITED STATES PATENT OFFICE.

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE.

MOTOR-VEHICLE ATTACHMENT.

Application filed July 26, 1927. Serial No. 208,534.

The accompanying drawings illustrate the preferred form of the invention; though it is to be understood that the invention is not limited to the exact details of construction shown and described, as it is obvious that various modifications thereof within the scope of the claims will occur to persons skilled in the art. In said drawings:

Figure 1 is a side elevation of the front portion of a chassis side member showing the present invention applied thereto;

Fig. 2 is a top plan view of the end of the chassis side member with the top chord removed showing the invention;

Fig. 3 is a front elevation of the attachment; and

Fig. 4 is a sectional view on the line 4—4 of Fig. 1.

This invention relates to a motor vehicle attachment and has particular reference to an attaching bracket or the like for supporting a bumper or any other desired article.

The fundamental object of this invention is the provision of a device of the above-mentioned character which will afford a strong and durable support.

A further object of the invention is the provision of an attaching bracket of cast metal adapted to be secured to the chassis of a motor vehicle whereby to provide a strong and durable mounting for a bumper or the like.

Other objects and advantages of this invention will be apparent from the following description, taken in conjunction with the accompanying drawings, in which 1 indicates a portion of a chassis side member, the forward end 2 of which is straight, as is usual. Chassis side members are generally of channel shape having upper and lower flanges or chords 3 and 4 and a web 5. The chassis is provided with the usual springs 6 secured to front and rear shackles 7 and 8, respectively.

More particularly the device of the present invention comprises an attaching bracket A secured to the end of the frame member 1 and having a head 9 which rests against the extreme end of the frame member 1 with the upper end of the head substantially in alinement with the chord 3 and the lower portion extended below the chord 4, as clearly shown in Fig. 1. In other words, the head 9 is so positioned against the end of the channel member that shocks to which the head may be subjected are imparted directly to the frame member at the end thereof, through the top and bottom chords and the web.

The head 9 is provided with a reduced end forming a shoulder portion 10 of sufficient size as to be readily positioned within the channel side member, and said reduced end defines an abutting surface which engages the end of the side member and is preferably welded thereto as at 13. The shoulder portion is preferably formed so that the entire device may be accurately positioned with respect to the channel side member, therefore the said shoulder portion is usually constructed so that the upper and lower surfaces thereof will engage the chords 3 and 4 respectively. Extending rearwardly from the shoulder 10 and from one side thereof is an attaching leg 11 and said leg is so arranged that when the bracket is positioned against the end of the frame member 1 it lies immediately adjacent the inner face of the web 5 of the frame member and is attached thereto by means of rivets 12 or the like, the latter being arranged at different levels in order that the web will not be weakened. For reinforcing purposes the leg 11 is formed with ribs 14 which extend to the shoulder 10 as clearly shown in Fig. 2.

The head 9 is provided with upper and lower apertures 15 which receive bolts 16 by which an article such, for example, as an auxiliary bracket 17 may be supported and the front face of the head is preferably recessed as shown at 18 thereby defining in reality a continuous attaching flange 19 around the entire front face of the head.

The drawings disclose an auxiliary bracket 17 supported by the main bracket A but it is to be understood that this is merely by way of example, as obviously other devices may be supported by the bracket A. For instance, a bumper or a bumper channel might be connected directly to the bracket A within the spirit of the invention, the latter comprising the motor vehicle attachment or supporting bracket, as shown and described.

What is claimed is:

1. A bumper fitting comprising an elongated block having a substantially rectangular attaching face with apertures in opposite ends thereof for receiving supporting bolts for a bumper bracket or the like, a reduced portion extending rearwardly from the block at substantially a right angle thereto, and an attaching portion extending rearwardly from the reduced portion for securing the fitting to a support.

2. A motor vehicle attachment of the kind described comprising a head portion adapted to abut the end of a channel side member, a shoulder portion extending rearwardly from the head portion at right angles thereto, an attaching leg extending rearwardly from the shoulder portion and arranged at one side of the latter and adapted to be positioned adjacent and to be secured to the web of said channel, and reinforcing webs connecting the upper and lower edges of the attaching leg with the upper and lower edges of the shoulder portion.

3. In combination with a channel forming a chassis side member having the forward end thereof terminating in an abutting surface arranged at substantially right angles to a horizontal plane through said member, a bumper fitting secured to said channel and comprising an elongated head arranged in contact with the abutting surface and extending below the channel, said head being provided with a substantially rectangular attaching face and apertures at the upper and lower ends thereof for receiving fasteners.

In witness whereof I have hereunto set my hand.

ELBERT J. HALL.